(12) United States Patent
Feng et al.

(10) Patent No.: US 11,403,779 B2
(45) Date of Patent: Aug. 2, 2022

(54) METHODS, APPARATUSES, SYSTEMS, AND STORAGE MEDIA FOR LOADING VISUAL LOCALIZATION MAPS

(71) Applicant: UISEE TECHNOLOGIES (BEIJING) CO., LTD, Beijing (CN)

(72) Inventors: Wei Feng, Beijing (CN); Wei Lin, Beijing (CN); Xiaotong Liu, Beijing (CN); Xin Zhou, Beijing (CN)

(73) Assignee: UISEE TECHNOLOGIES (BEIJING) CO., LTD, Beijing (CN)

( * ) Notice: Subject to any disclaimer, the term of this patent is extended or adjusted under 35 U.S.C. 154(b) by 368 days.

(21) Appl. No.: 16/627,669

(22) PCT Filed: Jan. 8, 2019

(86) PCT No.: PCT/CN2019/070894
§ 371 (c)(1),
(2) Date: Dec. 30, 2019

(87) PCT Pub. No.: WO2020/103319
PCT Pub. Date: May 28, 2020

(65) Prior Publication Data
US 2021/0358166 A1 Nov. 18, 2021

(30) Foreign Application Priority Data
Nov. 21, 2018 (CN) .......................... 201811393107.1

(51) Int. Cl.
*G06T 7/70* (2017.01)
*G06T 7/73* (2017.01)
(Continued)

(52) U.S. Cl.
CPC ........... *G06T 7/74* (2017.01); *B60W 60/0027* (2020.02); *G01C 21/3889* (2020.08);
(Continued)

(58) Field of Classification Search
CPC ............ G06T 7/74; G06T 2207/30241; G05D 1/0246; B60W 60/0027; G06F 16/29
See application file for complete search history.

(56) References Cited

U.S. PATENT DOCUMENTS 8,529,346 B1 * 9/2013 Johnston ................. A63F 13/95
463/31
10,600,206 B2 * 3/2020 Chen ......................... G06T 7/74
(Continued)

FOREIGN PATENT DOCUMENTS

CN 101201824 A 6/2008
CN 101551252 A 10/2009
(Continued)

OTHER PUBLICATIONS

China National Intellectual Property Administration, International Search Report for PCT/CN2019/070894, dated Aug. 28, 2019, 9 pages (including Cihnese and English versions).

*Primary Examiner* — Sam Bhattacharya
(74) *Attorney, Agent, or Firm* — MagStone Law, LLP; Enshan Hong

(57) ABSTRACT

According to some aspects of the present disclosure, a method for loading a visual localization map is provided. The method may include: localizing a current pose; predicting, based on the current pose, a set of group numbers to be loaded for the visual localization map, wherein each group number in the set of group numbers to be loaded corresponds to a sub-map file of the visual localization map, wherein the visual localization map includes a master map file and a plurality of sub-map files, wherein the plurality of sub-map files respectively store map data of corresponding groups obtained by grouping the visual localization map based on key frames, and wherein key frame index information for indexing the plurality of sub-map files is stored in the master (Continued)

map file; and loading corresponding sub-map files based on the group numbers in the set of group numbers to be loaded.

20 Claims, 7 Drawing Sheets

(51) Int. Cl.
*G06F 16/29* (2019.01)
*G06F 16/901* (2019.01)
*B60W 60/00* (2020.01)
*G01C 21/00* (2006.01)
*G05D 1/02* (2020.01)

(52) U.S. Cl.
CPC .......... *G05D 1/0274* (2013.01); *G06F 16/29* (2019.01); *G06F 16/9024* (2019.01); *G06T 2207/30241* (2013.01); *G06T 2207/30252* (2013.01)

(56) References Cited

U.S. PATENT DOCUMENTS

| | | | |
|---|---|---|---|
| 2016/0109242 A1* | 4/2016 | Applegate | G01C 21/206 701/431 |
| 2017/0139986 A1* | 5/2017 | Guzenda | G06F 16/27 |
| 2018/0211399 A1 | 7/2018 | Lee et al. | |
| 2019/0011566 A1* | 1/2019 | Yan | G06V 20/58 |
| 2019/0155296 A1* | 5/2019 | Moore | G05D 1/0274 |
| 2021/0164785 A1* | 6/2021 | Dooley | G01S 17/89 |

FOREIGN PATENT DOCUMENTS

| | | |
|---|---|---|
| CN | 105631038 A | 6/2016 |
| CN | 107808395 A | 3/2018 |
| CN | 108256574 A | 7/2018 |
| CN | 109661659 A | 7/2018 |

\* cited by examiner

METHODS, APPARATUSES, SYSTEMS, AND STORAGE MEDIA FOR LOADING VISUAL LOCALIZATION MAPS

CROSS-REFERENCE TO RELATED APPLICATIONS

This application is a national phase application of International Application No. PCT/CN2019/070894, filed on Jan. 8, 2019, which claims priority to Chinese Patent Application No. 201811393107.1, filed on Nov. 21, 2018, each of which is hereby incorporated by reference in its entirety.

TECHNICAL FIELDS

The present disclosure relates to the field of artificial intelligence, and more particularly, to methods, apparatuses, systems, and storage media for loading a visual localization map and visual localization methods.

BACKGROUND

A visual localization map is a map obtained by visual localization and mapping, which is usually constructed using visual simultaneously localization and mapping (SLAM) technologies. During the construction of the visual localization map, the information of key frames and map points is obtained. Each key frame has a matching map point. The key frames, the map points, and their matching relationship may form a typical visual localization map. To facilitate flexible storage and loading of a visual localization map of a huge data size and to reduce the huge memory overhead during the running of the visual localization map, the visual localization map may be decomposed into a plurality of sub-map files.

In a visual localization process, whether a local map needs to be updated is generally determined based on an intermediate result of one localization calculation. If the local map needs to be updated while the key frames, the map points, and other data involved in the local map have not been loaded into memory, it is necessary to wait for the loading of related sub-map files. The process of loading one sub-map file may take several to dozens of localization cycles. Such loading wait time will affect the instantaneity of visual localization.

Therefore, a new visual localization map loading technology is urgently needed to solve the above problems.

SUMMARY

The present disclosure is provided in view of the above problems. The present disclosure provides for methods, devices, systems, and storage media for loading a visual localization map, and a visual localization method.

The present disclosure provides a method for loading a visual localization map, including:
localizing a current pose;
directly predicting, based on the current pose, a set of group numbers to be loaded for the visual localization map, wherein each group number in the set of group numbers to be loaded corresponds to a sub-map file of the visual localization map, wherein the visual localization map includes a master map file and a plurality of sub-map files, wherein the plurality of sub-map files store map data of corresponding groups obtained by grouping the visual localization map based on key frames, respectively, and wherein the master map file stores key frame index information for indexing the plurality of sub-map files is stored; and
loading corresponding sub-map files based on the group numbers in the set of group numbers to be loaded.

In some embodiments, directly predicting, based on the current pose, the set of group numbers to be loaded for the visual localization map based on the current pose may include:
planning a current desired trajectory based on the current pose; and
predicting the set of group numbers to be loaded based on the current desired trajectory and the master map file.

In some embodiments, the predicting the set of group numbers to be loaded based on the current desired trajectory and the master map file includes:
traversing desired trajectory points in the desired trajectory one by one based on their distances from a current position from near to far, and for each desired trajectory point, determining, based on world coordinates of the desired trajectory point and the master map file, the group numbers in the set of group numbers to be loaded, until the number of group numbers in the set of group numbers to be loaded reaches a set threshold.

In some embodiments, determining, based on the world coordinates of the desired trajectory point and the master map file, the group numbers in the set of group numbers to be loaded may include:
indexing the key frame index information based on the world coordinates of the desired trajectory point to obtain key frames within a first range; and
traversing the key frames within the first range one by one, and for each key frame, determining the group numbers in the set of group numbers to be loaded based on the key frame, until the number of group numbers in the set of group numbers to be loaded reaches the set threshold.

In some embodiments, determining the group numbers in the set of group numbers to be loaded based on the world coordinates of the desired trajectory point and the master map file may include:
indexing the key frame index information based on the world coordinates of the desired trajectory point to obtain key frames within the first range;
determining key frames within a second range from the key frames within the first range based on the heading of the desired trajectory point; and
traversing the key frames within the second range one by one, and for each key frame, determining, based on the key frame, the group numbers in the set of group numbers to be loaded, until the number of group numbers in the set of group numbers to be loaded reaches the set threshold.

In some embodiments, the method may further include:
determining a circular area with a center of circle defined by the world coordinates of the desired trajectory point and a radius of a preset value as the first range.

In some embodiments, the method may further include:
determining the preset value based on a desired speed of the desired trajectory point.

In some embodiments, the method may further include:
determining a range including only a preset number of key frames closest to the desired trajectory point as the first range.

In some embodiments, the method may further include:
determining the preset number based on the desired speed of the desired trajectory point.

In some embodiments, determining, based on the key frame, the group numbers in the set of group numbers to be loaded may include:

determining whether the sub-map file corresponding to the group number of the key frame has been loaded and whether the group number of the key frame has been included in the set of group numbers to be loaded; and in the case that the sub-map file corresponding to the group number of the key frame has not been loaded and the group number of the key frame has not been included in the set of group numbers to be loaded, adding the group number of the key frame to the set of group numbers to be loaded.

In some embodiments, loading the corresponding sub-map files based on the group numbers in the set of group numbers to be loaded may include:

loading the map data in the corresponding sub-map files into memory.

In some embodiments, a checksum of each sub-map file is also stored in the master map file; and wherein the loading corresponding sub-map files based on the group numbers in the set of group numbers to be loaded further includes:

obtaining the checksums of the sub-map files corresponding to the group numbers from the master map file; and checking the sub-map files corresponding to the group numbers based on the checksums.

In some embodiments, localizing a current pose may include localizing the current pose using a sensor, wherein the current pose includes the current position and the heading.

In some embodiments, localizing the current pose may include:

obtaining a current image;

extracting feature points of the current image; and performing feature matching on the visual localization map based on the feature points to obtain the current pose.

According to another aspect of the present disclosure, a device for loading a visual localization map is provided, including:

a localization module configured to localize a current pose;

a prediction module configured to directly predict, based on the current pose, a set of group numbers to be loaded for the visual localization map, wherein each group number in the set of group numbers to be loaded corresponds to a sub-map file of the visual localization map, wherein the visual localization map includes a master map file and a plurality of sub-map files, wherein the plurality of sub-map files store map data of corresponding groups obtained by grouping the visual localization map based on key frames, respectively, and wherein key frame index information for indexing the plurality of sub-map files is stored in the master map file; and a loading module configured to load corresponding sub-map files based on the group numbers in the set of group numbers to be loaded.

According to yet another aspect of the present disclosure, a system for loading a visual localization map is further provided. The system may include a processor and a memory, wherein the memory stores computer program instructions, and the computer program instructions are configured to execute the method for loading the visual localization map when executed by the processor.

According to still another aspect of the present disclosure, a storage medium is further provided, wherein program instructions are stored on the storage medium, and the program instructions are configured to perform the method for loading the visual localization map when being executed.

In addition, accordingly to one aspect of the present disclosure, a visual localization method is further provided, including:

loading the sub-map files using the method for loading the visual localization map to construct a local map based on the current pose;

obtaining an image to be localized; and performing visual localization using the local map based on the image to be localized.

In the methods, devices and systems for loading the visual localization map, the storage medium and the visual localization method based on the embodiments of the present disclosure, by predicting the sub-map files to be used and loading the same in advance, the loading wait time of the sub-map files in need of use is eliminated, thereby ensuring the instantaneity of visual localization.

The above description is only an overview of the technical solution of the present disclosure. In order to understand the technical means of the present disclosure more clearly, it may be implemented in accordance with the contents of the specification. Furthermore, in order to make the above and other objectives, features, and advantages of the present disclosure more comprehensible, specific embodiments of the present disclosure are enumerated below.

BRIEF DESCRIPTION OF THE DRAWINGS

The above and other objectives, features, and advantages of the present disclosure will become more obvious through the description of the embodiments of the present disclosure in more detail in combination with the drawings. The drawings are used for providing a further understanding of the present disclosure and constitute a part of the specification. The drawings, together with the embodiments of the present disclosure, are used for explaining the present disclosure but do not constitute limitations to the present disclosure. In the drawings, the same reference signs generally represent the same components or steps.

DETAILED DESCRIPTION OF THE EMBODIMENTS

To clarify the objectives, technical solutions, and advantages of the present disclosure, exemplary embodiments of the present disclosure will be described below in detail with reference to the drawings. Apparently, the embodiments described herein are merely a part, but not all, of the embodiments of the present disclosure. It should be understood that the present disclosure is not limited by the exemplary embodiments described herein. All other embodiments, obtained by those of ordinary skill in the art based on the embodiments of the present disclosure described in the present disclosure without any creative effort, should fall into the protection scope of the present disclosure.

A visual localization map may be a map obtained by visual localization and mapping. The visual localization map may include key frames, map points, and their matching relationship. Due to the huge data size of the visual localization map, in order to facilitate flexible storage and loading for use and to reduce the huge memory overhead during the running of the visual localization map, the visual localization map may be decomposed into a plurality of sub-map files. The files involved in the visual localization map may include a master map file and a plurality of sub-map files. The plurality of sub-map files may respectively store map data of corresponding groups obtained by grouping the visual localization map based on key frames. Key frame index information for indexing the plurality of sub-map files may be stored in the master map file. Accordingly, required sub-map files may be selected for loading and use as needed when in use. A method for loading a visual localization map according to one embodiment of the present disclosure is described below with reference to FIG. 1. The method may be used for autonomous vehicles, robots, and any other equipment.

Figure 1:
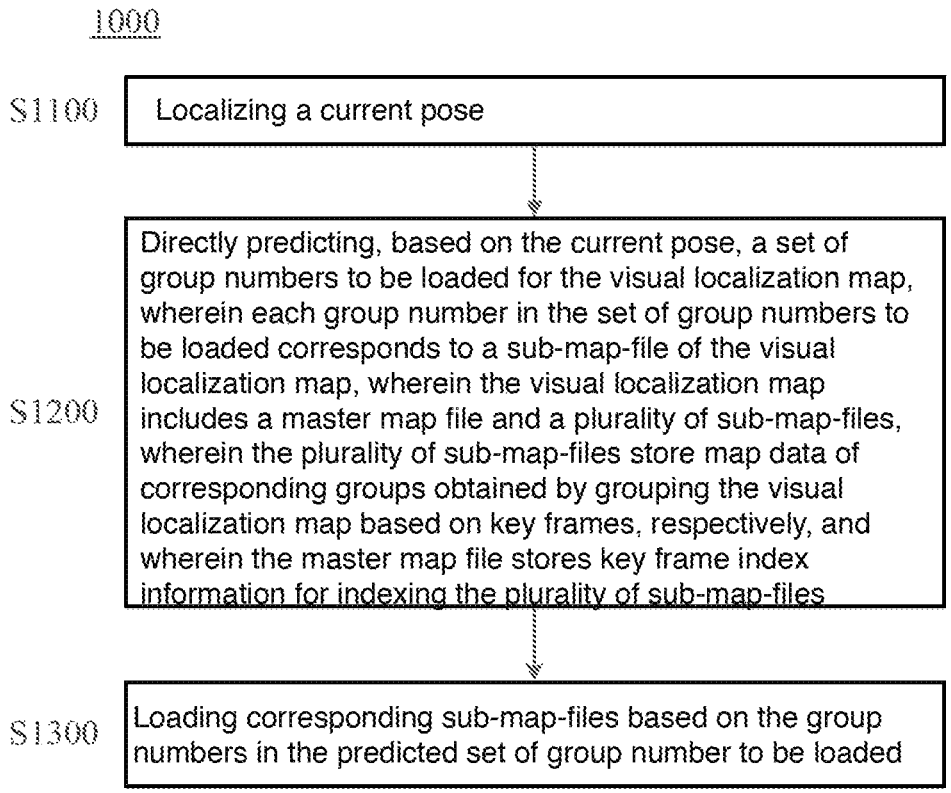
FIG. 1 shows a schematic flow diagram of a method for loading a visual localization map according to one embodiment of the present disclosure.

FIG. 1 shows a schematic flow diagram of a method 1000 for loading a visual localization map according to one embodiment of the present disclosure. As shown in FIG. 1, method 1000 may include steps S1100, S1200, and S1300.

Step S1100: localizing a current pose.

The current pose may include a current position and heading. The current position may be, for example, indicated by world coordinates. The heading may also be referred to as a driving direction or a forward direction, which may be, for example, indicated by a heading angle of equipment. For example, the current pose of an autonomous vehicle may be localized to obtain the current position and heading of the autonomous vehicle. As another example, the current pose of a robot may be localized to obtain the current position and heading of the robot.

A range of the visual localization map to be used may be predicted based on the current pose. The current pose may be localized using any existing or future developed technologies.

As an example, the current pose may be localized using a sensor. For example, the current pose may be localized using a Global Positioning System (GPS). As another example, the current pose may be localized using an inertial navigation system (INS) sensor.

Step S1200, predicting, based on the current pose that is localized in step S1100, a set of group numbers to be loaded for the visual localization map.

As described above, the visual localization map may include a master map file and a plurality of sub-map files. The plurality of sub-map files may store map data obtained by grouping the visual localization map, respectively. The grouping operation may be performed based on key frames of the visual localization map. Each sub-map file may correspond to map data of a group. Key frame index information for indexing the plurality of sub-map files may be stored in the master map file. Each group number in the set of group numbers to be loaded may correspond to a sub-map file of the visual localization map.

The key frame index information in the master map file may include spatial index information. The indexing may be performed based on a determined spatial position to obtain related key frame information. The key frame information may include information of a group number to which the key frame belongs. Key frames with the same group number are stored in the sub-map file corresponding to the group number. Through the key frame index information in the master map file, the range of the visual localization map to be used may be predicted based on the current pose. Specifically, it may be determined which key frames are included in the range of the visual localization map to be used. The sub-map files to be loaded may then be determined accordingly. The group numbers corresponding to these sub-map files are added to the set of the group numbers that are to be loaded.

It may be understood that step S1200 may be performed directly and automatically after step S1100. It does not depend on the determination about whether it is necessary to update a local map and whether it is necessary to load new sub-map files. In other words, in the technical solution of the present application, the above-mentioned determination operation does not have to be performed, and step S1200 is actively performed regardless of whether the new sub-map files need to be loaded currently. Therefore, the sub-map files to be loaded are predicted in real time. That is, the sub-map files to be used in a future period of time are predicted.

Step S1300, loading corresponding sub-map files based on the group numbers in the set of group numbers to be loaded that are predicted in step S1200.

Each sub-map file in the visual localization map may correspond to a unique group number. Therefore, the corresponding sub-map files may be loaded based on the group numbers in the set of group number to be loaded that are predicted in step S1200.

The sub-map files in the visual localization map may be stored in the cloud or a data storage at a server and may also be stored in a local hard disk. The corresponding sub-map files may be loaded based on the group numbers in the set of group numbers to be loaded. The sub-map files corresponding to the group numbers may be loaded into a data cache that may be read in real time when map data is required to be used.

In some embodiments, the map data in the sub-map files corresponding to the group numbers may be loaded into a memory. Therefore, it is ensured that the required map data may be obtained in real time for real-time visual localization.

In some embodiments, a checksum of each sub-map file may further be stored in the master map file. When the corresponding sub-map files are loaded based on the group numbers in the set of group numbers to be loaded of group numbers to be loaded, the checksums of the sub-map files corresponding to the group numbers may be obtained from the master map file. The sub-map files corresponding to the group numbers may be checked based on the checksums. Therefore, the data integrity of the loaded sub-map files is ensured, thereby ensuring the reliability of real-time visual localization.

In the above solution, by directly predicting the sub-map files to be used and loading the same in advance, the wait time for loading of the sub-map files to be used is eliminated. This may ensure the instantaneity of visual localization.

Figure 2:
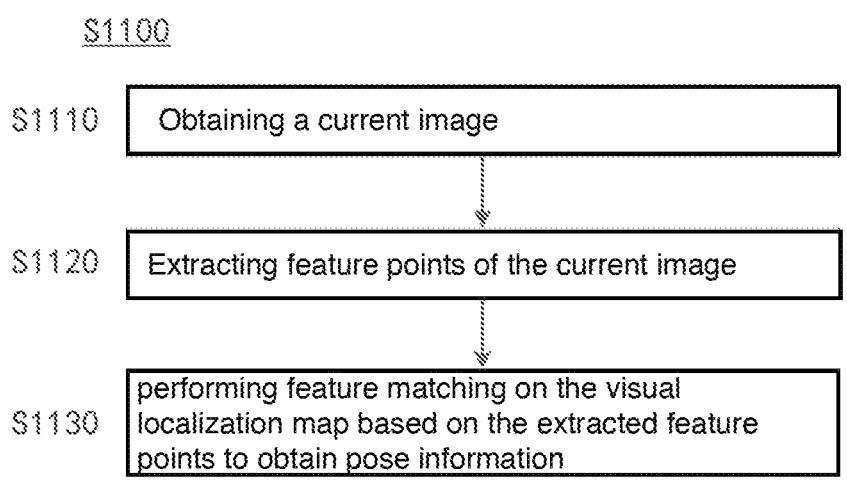
FIG. 2 shows a schematic flow diagram of localizing a current pose according to one embodiment of the present disclosure.

In one embodiment, the current pose may be localized by performing feature matching using a current image. FIG. 2 shows a schematic flow diagram of step S1100, localizing the current pose, according to one embodiment of the present disclosure. As shown in FIG. 2, step S1100 may include steps S1110, S1120, and S1130.

Step S1110, obtaining a current image.

The current image may be an image obtained for a current scene. For example, the current image may be obtained by a vehicle-mounted camera or a vision device of a robot.

Step S1120, extracting feature points of the current image obtained in step S1110.

The feature points of an image may represent content features included in the image. The feature points of the image may include, for example, corner points and descriptors. The corner points may be conspicuous and representative areas in the image and may be used to represent positional information of the feature points in the image. The descriptors may be represented by vectors and may be used to describe information of pixels surrounding the corner points. A key frame in the visual localization map may contain all feature points of the image constituting the key frame. Correspondingly, the feature points may be extracted from the current image obtained in step S1110, so that localization may be performed using localization technologies that are based on the feature points.

Step S1130, performing feature matching on the visual localization map based on the feature points extracted in step S1120 to obtain the current pose.

The feature matching may be performed on the feature points extracted in step S1120 and the feature points in the visual localization map using any existing or future developed feature matching technology. If the number and quality of the matched feature points meet the inverse pose calculation requirements, the current pose may be calculated.

It may be understood that the foregoing solution of localizing the current pose using the current image requires the use of the map data of the local map of a certain range including the current pose. If the map data to be used, for example, some associated key frames or map points, are not in the local map, the local map needs to be updated. The feature matching and pose calculation may then be performed based on the updated local map. In this case, if the map data to be used have been loaded beforehand, the local map may be updated in real time to support real-time pose localization. Alternatively, it is necessary to wait for the completion of the loading of relevant map data before continuing the pose localization.

Figure 3:
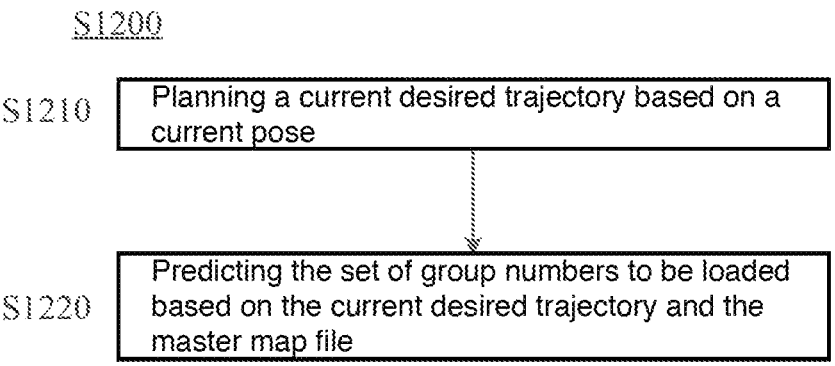
FIG. 3 shows a schematic flow diagram of directly predicting a set of group numbers to be loaded of a visual localization map based on the current pose in accordance with one embodiment of the present disclosure.

FIG. 3 shows a schematic flow diagram of step S1200, directly predicting, based on the current pose, the set of group numbers to be loaded for the visual localization map, in accordance with one embodiment of the present disclosure. As shown in FIG. 3, step S1200 includes steps S1210 and S1220.

Step S1210, planning a current desired trajectory based on the current pose.

The desired trajectory may include a sequence including a group of desired trajectory points. Each of the desired trajectory points may include world coordinates and heading. The desired trajectory may be a planned traveling/forward route of the equipment, such as a trajectory planed by the autonomous vehicle based on the current pose and navigation information or a trajectory autonomously planned by the robot based on the current pose and task requirements.

Every time a current pose is obtained, step S1220 may be performed immediately without determining whether this step is to be performed based on the current pose.

Step S1220, predicting the set of group numbers to be loaded based on the current desired trajectory planned in step S1210 and the master map file.

Based on the current desired trajectory planned in step S1210, the range of the visual localization map to be used may be predicted more accurately, thereby more accurately determining the set of group numbers to be loaded. As a result, the accuracy of prediction is improved, thereby ensuring the instantaneity of visual localization, and improving the effectiveness of memory use at the same time.

Specifically, the desired trajectory points in the current desired trajectory may be traversed one by one based on their distances from the current position from near to far. For each desired trajectory point, the group numbers in the set of group numbers to be loaded may be determined based on the world coordinates of the desired trajectory point and the master map file, until the number of group numbers in the set of group numbers to be loaded reaches a set threshold. In this way, the availability of the sub-map files corresponding to the predicted to-be-loaded group numbers may be guaranteed as much as possible, and invalid loading is reduced as much as possible.

Figure 4:
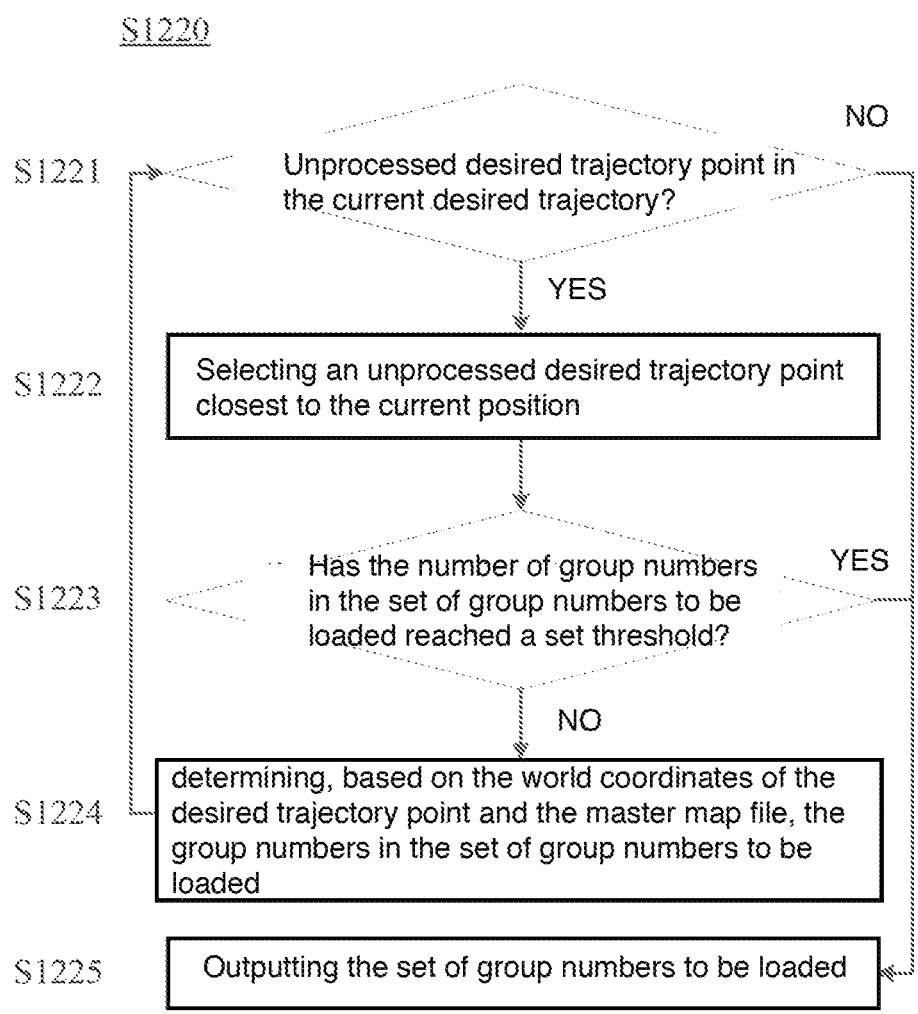
FIG. 4 shows a schematic flow diagram of predicting the set of group numbers to be loaded based on a current desired trajectory and a master map file in accordance with one embodiment of the present disclosure.

FIG. 4 shows a schematic flow diagram of step S1220, predicting the set of group numbers to be loaded based on the current desired trajectory and the master map file, in accordance with one embodiment of the present disclosure. As shown in FIG. 4, step S1220 includes steps S1221, S1222, S1223, S1224, and S1225.

Step S1221, determining whether any of the desired trajectory points in the current desired trajectory has not been processed.

If one or more of the desired trajectory points in the current desired trajectory has not been processed, step S1222 may be proceeded to perform prediction processing. Alternatively, this may indicate that the prediction processing of the current desired trajectory is completed, and step S1225 may be performed to output the set of group numbers to be loaded.

Step S1222, selecting an unprocessed desired trajectory point closest to the current position.

In the case that there is one or more unprocessed desired trajectory points in the current desired trajectory, the unprocessed desired trajectory point closest to the current position is selected, and step S1223 is performed for prediction processing.

Step S1223, determining whether the number of group numbers in the set of group numbers to be loaded has reached a set threshold.

The set threshold may be a threshold of the number of elements in the set of group numbers to be loaded. It may be understood that the amount of memory space may be defined. To avoid insufficient memory space, an appropriate set threshold may be set based on the size of the sub-map file to reasonably use the memory space. Before predicting new group numbers to be loaded, a determination may first be made as to whether the number of group numbers in the set of group numbers to be loaded reaches the set threshold. If the number of group numbers in the set of group numbers to be loaded has not reached the set threshold, this may indicate that there is sufficient memory space for preloading. Step S1224 may be proceeded to perform the prediction processing. Alternatively, step S1225 may be performed to output the set of group numbers to be loaded. It may be understood that the set of group numbers to be loaded may be equivalent to a first-in-first-out cache. The sooner the group numbers of the set of group numbers to be loaded are added, the sooner the loading operation of the corresponding sub-map files may be performed. Upon the completion of the loading of the corresponding sub-map files, the group numbers may be released from the set of group numbers to be loaded.

Step S1224, determining, based on the world coordinates of the desired trajectory point selected in step S1222 and the master map file, the group numbers in the set of group numbers to be loaded.

In step S1224, based on the world coordinates of the desired trajectory point selected in step S1222, spatial indexing may be performed using the key frame index information in the master map file to index key frames within a range taking the world coordinates as reference, and then the group numbers in the set of group numbers to be loaded may be determined based on the indexed key frames. For example, key frames in a rectangular area centered on the world coordinates and having a longitude direction length of value A and a latitude direction length of value B may be indexed. As a result, the sub-map files to be loaded may be further predicted more accurately to ensure the instantaneity of visual localization. So far, the process of determining the group numbers to be loaded based on the currently selected desired trajectory point is completed, and the method may return to step S1221 to determine whether there is any unprocessed desired trajectory point in the current desired trajectory.

Step S1225, outputting the set of group numbers to be loaded.

In the above solution, the set of group numbers to be loaded is predicted using the desired trajectory point, so that the availability of the sub-map files corresponding to the predicted to-be-loaded group numbers may be guaranteed as much as possible, and invalid loading is reduced as much as possible.

Optionally, the key frame index information may be indexed based on the world coordinates of the desired trajectory point to obtain key frames within a first range. The key frames within the first range may be traversed one by one. For each of the key frames, the group numbers in the set of group numbers to be loaded may be determined based on the key frame until the number of group numbers in the set of group numbers to be loaded reaches the set threshold.

Figure 5:
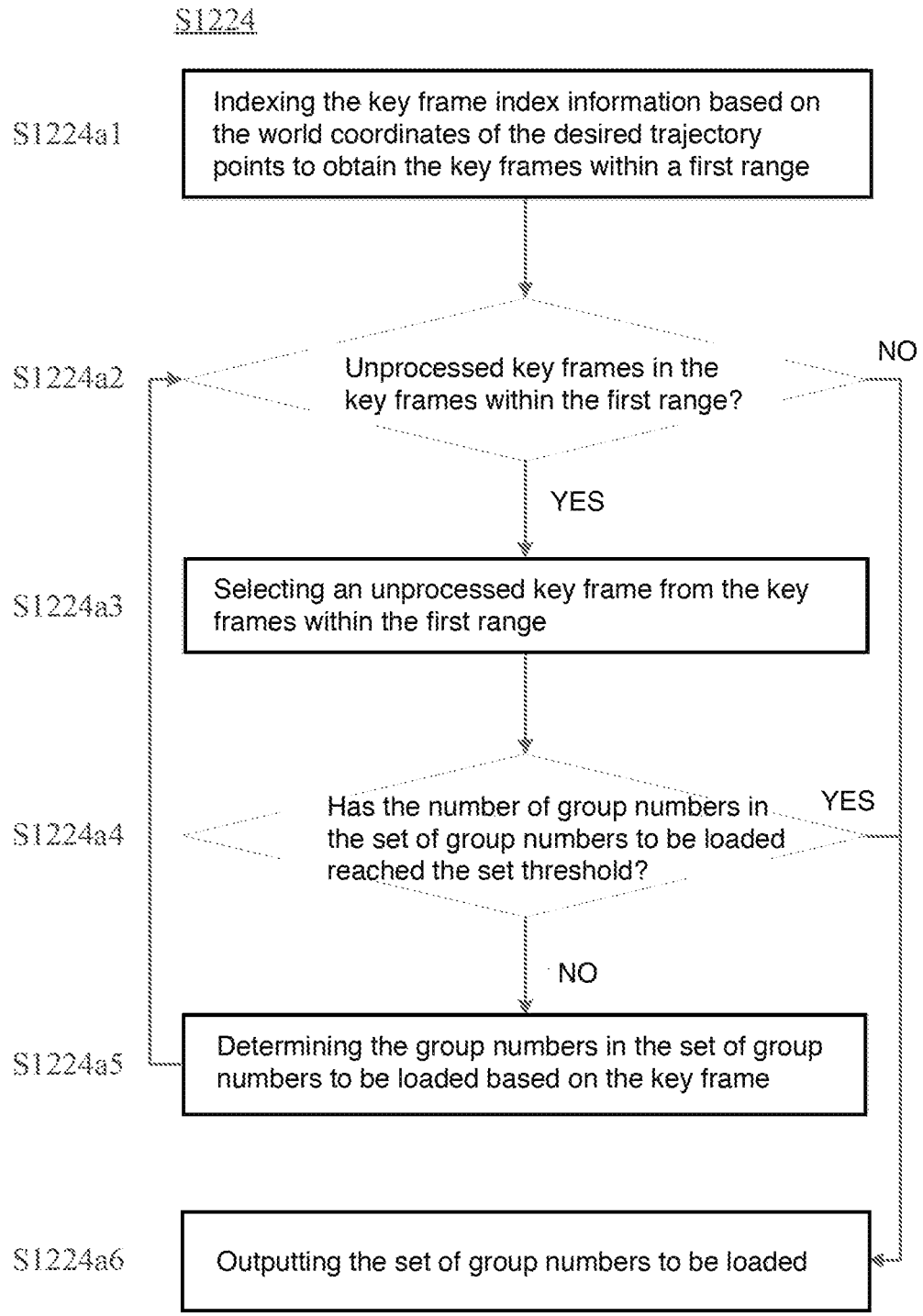
FIG. 5 shows a schematic flow diagram of determining group numbers in the set of group numbers to be loaded based on world coordinates of the desired trajectory point and the master map file in accordance with one embodiment of the present disclosure.

FIG. 5 shows a schematic flow diagram of step 1224, determining the group numbers in the set of group numbers to be loaded based on the world coordinates of the desired trajectory point selected in step S1222 and the master map file, in accordance with one embodiment of the present invention. As shown in FIG. 5, step S1224 includes steps S1224a1, S1224a2, S1224a3, S1224a4, S1224a5, and S1224a6.

Step S1224a1, indexing the key frame index information based on the world coordinates of the desired trajectory points to obtain the key frames within a first range.

The first range may represent a prediction range, which may be set as needed. The first range may be set with reference to the world coordinates of the desired trajectory point.

For example, the rectangular area centered on the world coordinates and having the longitude direction length of value A and the latitude direction length of value B described above may be determined as the first range. The key frame index information may be indexed using the world coordinates of the desired trajectory point as an index keyword (KEY) and the first range as an index area to obtain the key frames within the first range.

In some embodiments, a circular area with a center of circle defined by the world coordinates of the desired trajectory point and a radius of a preset value may be determined as the first range. For example, based on the world coordinates of the desired trajectory point, key frames within a radius of 2 kilometers with the world coordinates being the center of circle may be searched.

In some embodiments, each desired trajectory point may correspond to a specific desired speed. The preset value of the radius may be determined based on the desired speed of the desired trajectory point. It may be understood that the higher the desired speed is, the larger the range of map data required for visual localization is. The preset value of the radius may be set as a greater value accordingly, or it may be set as a less value. Therefore, the accuracy of prediction and the effectiveness of memory use may be improved, thereby ensuring the instantaneity of visual localization.

In some embodiments, a range including only a preset number of key frames closest to the desired trajectory point may be determined as the first range. For example, based on the world coordinates of the desired trajectory point, 50 key frames closest to the world coordinates may be searched.

In some embodiments, similar to the preset value of the aforementioned radius, the aforementioned preset number may be determined based on the desired speed of the desired trajectory point. It may be understood that the higher the desired speed is, the larger the range of map data required for visual localization is. The preset number may be set as a greater value accordingly, or it may be set as a smaller value. Therefore, the accuracy of prediction and the effectiveness of memory use may be improved, thereby ensuring the instantaneity of visual localization.

Step S1224a2, determining whether there is any unprocessed key frame in the key frames within the first range obtained through step S1224a1.

If the key frames within the first range obtained through step S1224a1 have been processed, the processing is not repeated, and step S1224a6 is performed to output the set of group numbers to be loaded. If there is one or more unprocessed key frames, step S1224a3 is performed for the processing.

Step S1224a3, selecting an unprocessed key frame from the key frames within the first range.

An unprocessed key frame is selected from the key frames within the first range. In some embodiments, the unprocessed key frames may be selected based on their distances from the world coordinates of the desired trajectory point from near to far, so that the group numbers of the sub-map files closer to the world coordinates of the desired trajectory point may be added earlier to the set of group numbers to be loaded to improve the effectiveness of prediction loading. Optionally, an unprocessed key frame may be selected based on the size of a unique identification number of the key frame. Optionally, an unprocessed key frame is randomly selected.

Step S1224a4, determining whether the number of group numbers in the set of group numbers to be loaded reaches the set threshold.

In the case that the number of group numbers in the set of group numbers to be loaded has not reached the set threshold, step S1224a5 is continued to perform group number confirmation processing. Otherwise, step S1224a6 is performed to output the set of group numbers to be loaded. The specific processing procedure is similar to that in step S1223 and is thus not repeated herein again.

Step S1224a5, determining the group numbers in the set of group numbers to be loaded based on the key frame.

As described above, the visual localization map is grouped based on the key frame and the key frame information obtained through the key frame index information includes the group number information to which the key frame belongs. It may be understood that, for the key frames belonging to the same group, they have the same group number. In order to avoid repeatedly loading the same sub-map file, the group number added to the set of group numbers to be loaded is unique. That is, although there are multiple key frames in the prediction range corresponding to the same group number, the group number corresponding to these key frames may only be added to the set of group numbers to be loaded once. So far, the determination of the to-be-loaded group numbers based on the currently selected key frame is completed, and the method may return to step S1224a2 to determine whether there are unprocessed key frames in the key frames within the first range again.

Step S1224a6, outputting the set of group numbers to be loaded.

In the above solution, the related key frame information is indexed using the world coordinates of the desired trajectory point, and the group numbers in the set of group numbers to be loaded are determined using the key frame information. As such, the prediction of the sub-map files to be used is more accurate, and the use of the memory is more efficient, thereby improving the guarantee of instantaneity of visual localization.

Figure 6:
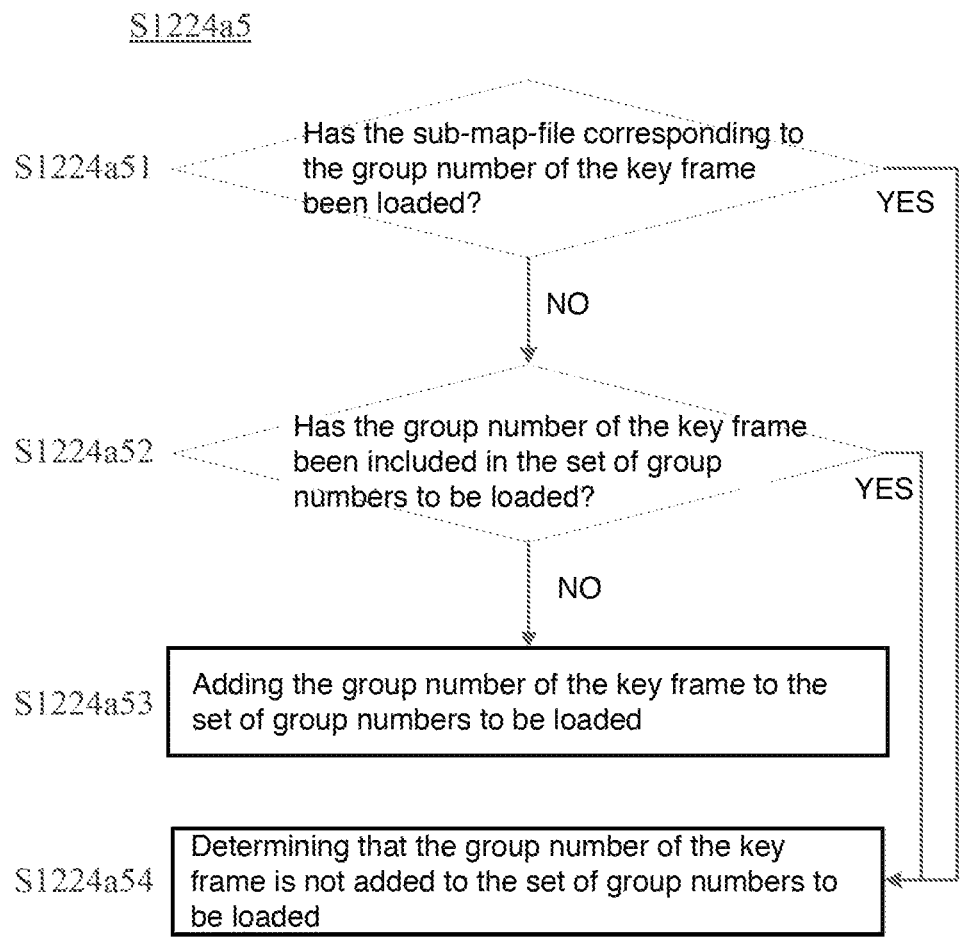
FIG. 6 shows a schematic flow diagram of determining the group numbers in the set of group numbers to be loaded based on key frames in accordance with one embodiment of the present disclosure.

FIG. 6 shows a schematic flow diagram of step S1224a, determining the group numbers in the set of group numbers to be loaded based on key frames, in accordance with one embodiment of the present disclosure. As shown in FIG. 6, step S1224a5 may include steps S1224a51, S1224a52, S1224a53, and S1224a54.

Step S1224a51, determining whether the sub-map file corresponding to the group number of the key frame has been loaded.

In the case that the sub-map file corresponding to the group number of the key frame has been loaded, in order to avoid duplicate loading, step S1224a54 is performed to determine that the group number of the key frame is not added to the set of group numbers to be loaded. In the case that the sub-map file corresponding to the group number of the key frame has not been loaded, step S1224a52 is proceeded.

Step S1224a52, determining whether the group number of the key frame has been included in the set of group numbers to be loaded.

In the case that the group number of the key frame has been included in the set of group numbers to be loaded, in order to avoid duplicate loading, step S1224a54 is performed to determine that the group number of the key frame is not added to the set of group numbers to be loaded. In the case that the group number of the key frame is not included in the set of group numbers to be loaded yet, the S1224a53 is performed.

Step S1224a53, adding the group number of the key frame to the set of group numbers to be loaded.

Step S1224a54, determining that the group number of the key frame is not added to the set of group numbers to be loaded.

The above solution ensures that a sub-map file belonging to the prediction range is only loaded once, thereby ensuring the effectiveness of prediction loading, avoiding the delay and waste of a memory caused by unnecessary duplicate loading, and improving the guarantee of instantaneity of visual localization.

Figure 7:
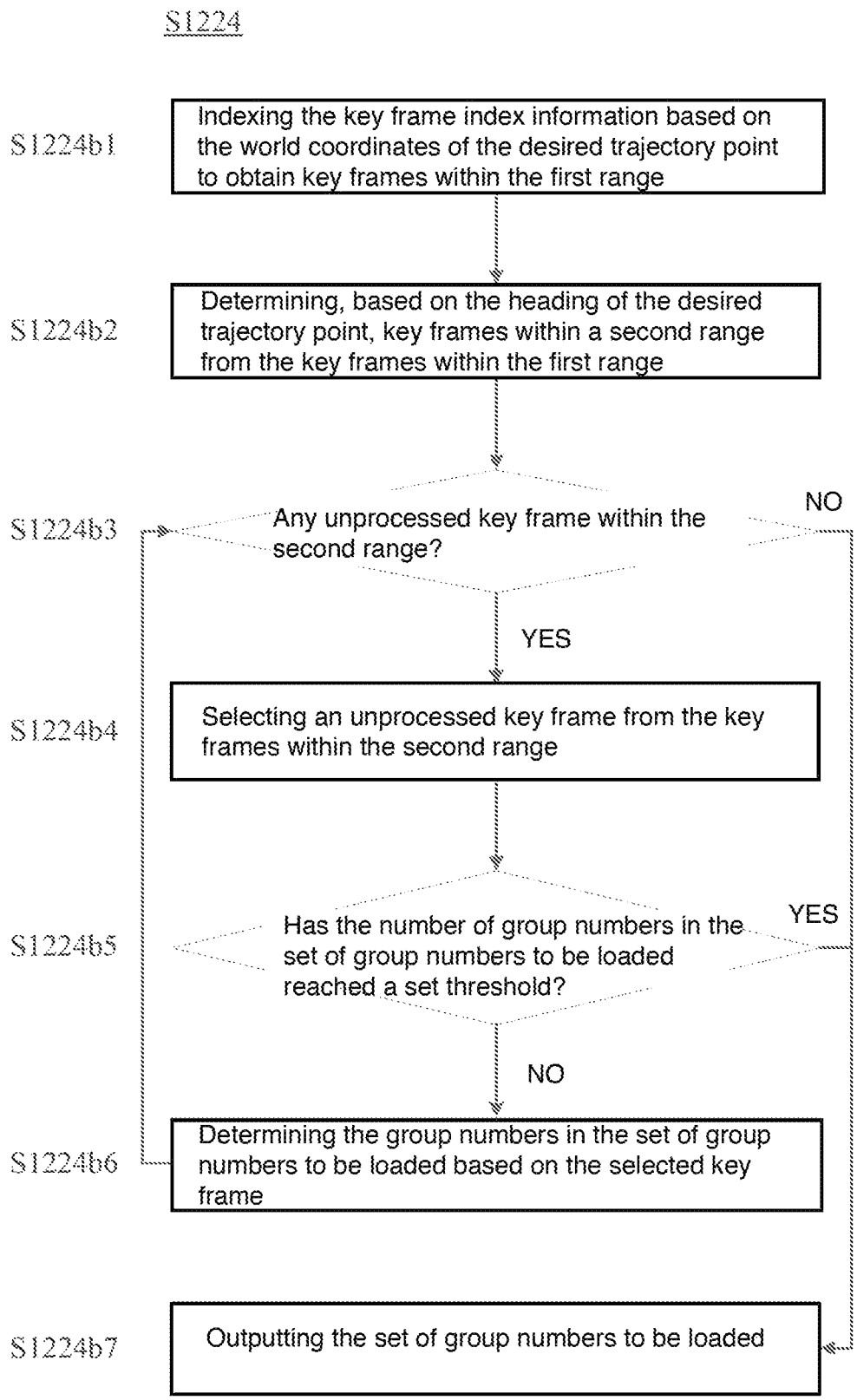
FIG. 7 shows a schematic flow diagram of determining the group numbers in the set of group numbers to be loaded based on the world coordinates of the desired trajectory point and the master map file in accordance with another embodiment of the present disclosure.

FIG. 7 shows a schematic flow diagram of step S1224, determining the group numbers in the set of group numbers to be loaded based on the world coordinates of the desired trajectory point and the master map file, in accordance with another embodiment of the present disclosure. As shown in FIG. 7, step S1224 may include steps S1224b1, S1224b2, S1224b3, S1224b4, S1224b5, S1224b6, and S1224b7. The functions, processing methods, and processes implemented by steps S1224b1, S1224b3, S1224b4, S1224b5, S1224b6, and S1224b7 are similar to those implemented by the above steps S1224a1, S1224a2, S1224a3, S1224a4, S1224a5, and S1224a6, respectively, and will thus not be repeated herein again. Only step S1224b2 is described in detail below.

Step S1224b1, indexing the key frame index information based on the world coordinates of the desired trajectory point to obtain key frames within the first range.

Step S1224b2, determining key frames within a second range from the key frames within the first range obtained in step S1224b1 based on the heading of the desired trajectory point.

Figure 8:
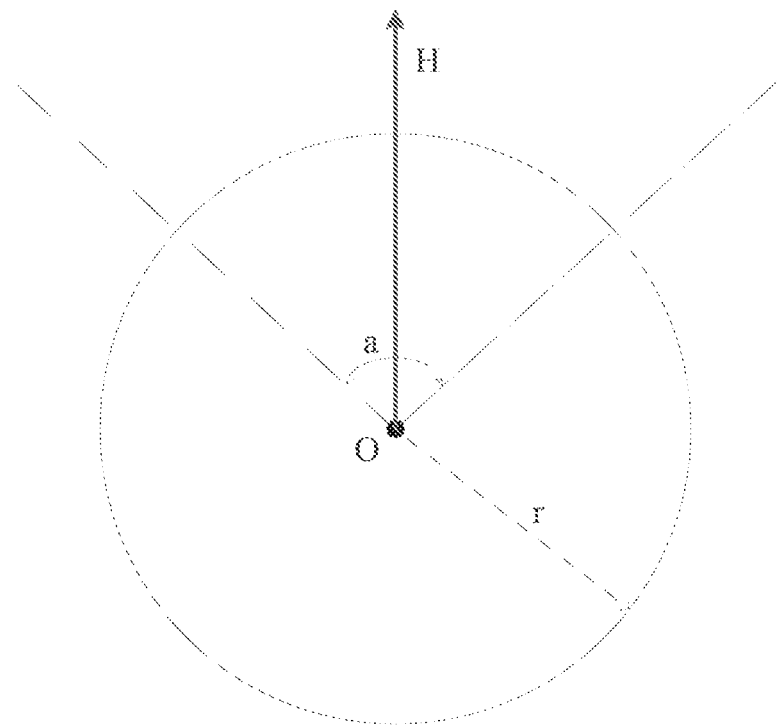
FIG. 8 shows a schematic diagram of indexing key frames based on the desired trajectory points in accordance with another embodiment of the present disclosure.

The heading of the desired trajectory point may indicate the traveling/forward direction when the equipment departs from the desired trajectory point. It may be understood that the map data closer to the heading of the desired trajectory point is more likely to be used for visual localization. The key frames within the second range may be determined from the key frames within the first range obtained in step S1224b1 based on the heading of the desired trajectory point, to further accurately predict the range. The second range may be, for example, a fan-shaped area of a preset angle with the heading of the desired trajectory point as the center direction. FIG. 8 shows a schematic diagram of indexing key frames based on the desired trajectory points in accordance with another embodiment of the present disclosure. As shown in FIG. 8, a point O represents the desired trajectory point, and the first range is a circular area with the point O being the center of circle and a radius r. OH represents the heading of the desired trajectory point. The second range is a fan-shaped area with the preset angle a and with OH being the center direction.

Step S1224b3, determining whether any of the key frames within the second range determined in step S1224b2 has not been processed.

In some embodiments in which there is one or more unprocessed key frames, the method may proceed to step S1224b4. Alternatively, step S1224b7 may be performed to output the set of group numbers to be loaded.

Step S1224b4, selecting an unprocessed key frame from the key frames within the second range determined in step S1224b2.

Step S1224b5, determining whether the number of group numbers in the set of group numbers to be loaded reaches a set threshold.

In the case that the number of group numbers in the set of group numbers to be loaded does not reach the set threshold, the method may proceed to step S1224b6 to perform group number confirmation processing. Otherwise, step S1224b7 is performed to output the set of group numbers to be loaded.

Step S1224b6, determining the group numbers in the set of group numbers to be loaded based on the key frame selected in step S1224b4.

So far, the determination of the group numbers to be loaded based on the currently selected key frame is completed. The method may return to step S1224b3 to determine whether there are unprocessed key frames in the key frames within the second range again.

Step S1224b7, outputting the set of group numbers to be loaded.

Through the above solution, the prediction range is more accurate, the sub-map files to be used may be loaded more timely and effectively, and the guarantee of instantaneity of visual localization is enhanced.

Figure 9:
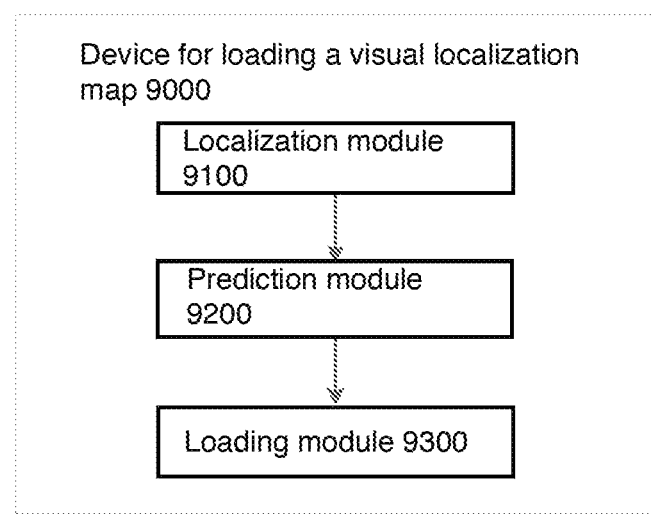
FIG. 9 shows a schematic block diagram of a device for loading a visual localization map according to one embodiment of the present disclosure.

According to another embodiment of the present disclosure, a device for loading a visual localization map is further provided. FIG. 9 shows a schematic block diagram of a device for loading a visual localization map according to one embodiment of the present disclosure. As shown in FIG. 9, the device 9000 for loading the visual localization map includes a localization module 9100, a prediction module 9200 and a loading module 9300.

The localization module 9100 may be configured to localize a current pose.

The prediction module 9200 may be configured to directly predict a set of group numbers to be loaded of the visual localization map based on the current pose, wherein each group number in the set of group numbers to be loaded may correspond to a sub-map file of the visual localization map. The visual localization map may include a master map file and a plurality of sub-map files. The plurality of sub-map files may store map data of corresponding groups obtained by grouping the visual localization map based on key frames, respectively. The key frame index information for indexing the plurality of sub-map files may be stored in the master map file.

The loading module 9300 may be configured to load sub-map files corresponding to the group numbers in the set of group numbers to be loaded.

In summary, various modules in the device 9000 for loading the visual localization map may be configured to specifically perform the corresponding steps in the methods for loading the visual localization map above. After reading the foregoing description of the methods, those of ordinary skill in the art may understand the specific implementation and technical effects of the device 9000 for loading the visual localization map.

According to yet another aspect of the present disclosure, a system for loading a visual localization map is further provided. The system may include a processor and memory, wherein the memory stores computer program instructions for implementing various steps of the methods for loading the visual localization map according to the embodiments of the present disclosure. The processor may be configured to run the computer program instructions stored in the memory to execute the steps of the methods for loading the visual localization map according to the embodiments of the present disclosure, and may also be configured to implement the localization module 9100, the prediction module 9200, and the loading module 9300 of the device for loading the visual localization map according to the embodiments of the present disclosure.

Accordingly to still another aspect of the present disclosure, a storage medium is further provided, wherein program instructions are stored on the storage medium, and the program instructions, when executed by a computer or a processor, cause the computer or the processor to execute the corresponding steps of the method for loading the visual localization map according to the embodiment of the present disclosure, and may also be configured to implement the corresponding modules of the device for loading the visual localization map according to the embodiments of the present disclosure. The storage medium may include, for example, a storage component of a tablet computer, a hard disk of a personal computer, a read-only memory (ROM), an erasable programmable read-only memory (EPROM), a portable compact disk read-only memory (CD-ROM), USB memory, or any combination of the above storage media. The computer-readable storage medium may be any combination of one or more computer-readable storage media.

Figure 10:
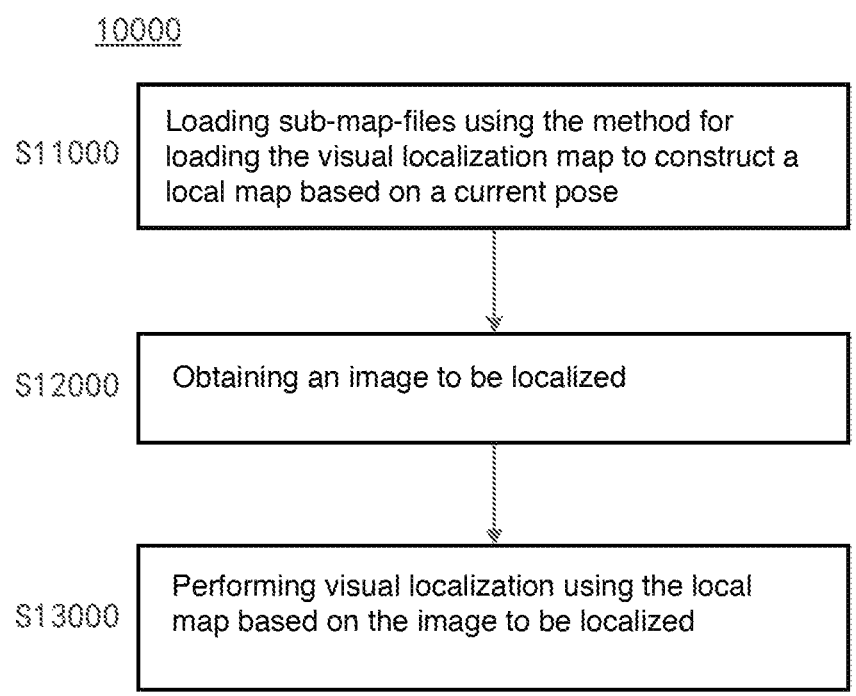
FIG. 10 shows a schematic flow diagram of a visual localization method according to one embodiment of the present disclosure.

In addition, according to yet another aspect of the present disclosure, a visual localization method is further provided. FIG. 10 shows a schematic flow diagram of a visual localization method 10000 according to one embodiment of the present disclosure. As shown in FIG. 10, the visual localization method 10000 may include steps S11000, S12000, and S13000.

Step S11000, loading sub-map files using the method for loading the visual localization map to construct a local map based on a current pose.

Step S12000, obtaining an image to be localized.

The image to be localized may be an image acquired for a current scene. For example, a current image obtained by a vehicle-mounted camera or a vision device of the robot.

Step S13000, performing visual localization using the local map constructed in step S11000 based on the image to be localized that is obtained in step S12000.

The feature points of an image may represent content features included in the image. The feature points of the image may include, for example, corner points and descriptors. The corner points may be conspicuous and representative areas in the image and are used for representing the positional information of the feature points in the image. The descriptors may be represented by vectors and may be used to describe the information of pixels surrounding the corner points. The key frames in the visual localization map contain all feature points of the image constituting the key frames. The feature matching may be performed on the feature points extracted from the current image and the feature points in the local map constructed in step S11000 using any existing or future developed feature matching technology. If the number and quality of the matched feature points meet the inverse pose calculation requirements, the current pose may be calculated, and the localization is successful.

Those of ordinary skill in the art may understand that, in the above visual localization process, the current pose may be quickly localized using GPS or INS and other technical means, the map range to be used may be predicted using the current pose, and the sub-map files to be used may be loaded in advance. Therefore, for subsequent visual localization, the local map required for use may be updated in real time, and there is no need to wait for the loading of the sub-map files to be used, so that real-time visual localization may be achieved. It may be understood that, for subsequent processing of prediction loading, the sub-map files may also be predicted and loaded by directly using the pose obtained by performing visual localization based on the current image. In the above visual localization process, if the initial pose is a pose obtained by performing visual localization based on the current image, it may be necessary to wait for the success of the initial visual localization before performing the prediction loading processing. At this time, depending on the complexity of the map and the complexity of the current image, the initial visual localization may have different delays. Subsequently, the local map may be updated using the sub-map files that are predicted and loaded in advance, and the visual localization may be performed based on the current image to enter a real-time localization state. As a result, the loading wait time of the sub-map files required for use may be eliminated, and real-time visual localization is achieved.

Those of ordinary skill in the art may be aware that, units and algorithm steps of the examples described in the embodiments disclosed herein may be implemented by electronic hardware or a combination of computer software and the electronic hardware. Whether these functions are implemented in the form of hardware or software is determined by specific applications and design constraint conditions of the technical solutions. Those skilled may implement the described functions using different methods for each specific application, but this implementation should not be considered as going beyond the scope of the present disclosure.

In the several embodiments provided by the present application, it should be understood that the disclosed equipment and method may be implemented in other manners. For example, the equipment embodiments described above are merely illustrative, e.g., the division of the units is only a logic function division, other division manners may exist in practical implementation, for example, a plurality of units or components may be combined or integrated to another equipment, or some features may be omitted or not implemented.

In the specification provided herein, numerous specific details are illustrated. It may be understood, however, that the embodiments of the present disclosure may be practiced without these specific details. In some instances, well-known methods, structures and techniques are not shown in detail so as not to obscure the understanding of the specification.

Similarly, it should be understood that, in order to simplify the present disclosure and help to understand one or more of the various aspects of the present disclosure, in the description of the exemplary embodiments of the present disclosure, various features of the present disclosure are sometimes grouped together into a single embodiment, figure or its description. However, the method of the present disclosure should not be construed to reflect the following intention. That is, the claimed disclosure requires more features than those explicitly recited in each claim. Or rather, as reflected by the corresponding claims, the creation lies in that corresponding technical problems may be solved with fewer features than all features of a certain single embodiment disclosed. Thus, the claims that follow the specific embodiments are hereby explicitly incorporated into the specific embodiments, where each claim itself serves as a separate embodiment of the present disclosure.

Those skilled in the art may understand that, except the mutually excluded features, all features disclosed in the specification (including the accompanying claims, abstract and drawings), and all processes or units of any method or equipment so disclosed may be combined using any combination. Unless otherwise expressly stated, each feature disclosed in the specification (including the accompanying claims, abstract and drawings) may be substituted by an alternative feature providing the same, equivalent or similar purpose.

In addition, those skilled in the art may understand that, although some embodiments described herein include some features included in other embodiments but not other features, the combinations of features of different embodiments are meant to be within the scope of the present disclosure and form different embodiments. For example, in the claims, any one of the claimed embodiments may be combined in any manner for use.

The various component embodiments of the present disclosure may be implemented by hardware, or by software modules running on one or more processors, or by a combination thereof. Those skilled in the art should understand that, when in practice, a microprocessor or a digital signal processor (DSP) may be used to implement some or all functions of some modules in the device for loading the visual localization map according to the embodiments of the present disclosure. The present disclosure may also be implemented as a device program (for example, a computer program and a computer program product) for performing a part or all of the methods described herein. Such a program that implements the present disclosure may be stored on a computer-readable medium or may have the form of one or more signals. Such signals may be downloaded from an Internet website, or provided on a carrier signal, or provided in any other forms.

It should be noted that the above-mentioned embodiments illustrate the present disclosure rather than limiting the present disclosure and that those skilled in the art may design alternative embodiments without departing from the scope of the appended claims. In the claims, any reference signs between parentheses shall not be construed as limiting the claims. The word "include" does not exclude the presence of elements or steps not listed in the claims. The term "a" or "an" in front of an element does not exclude the presence of a plurality of such elements. The present disclosure may be implemented by means of hardware, including several different elements and by means of a suitably programmed computer. In the unit claims listing several devices, several of these means may be specifically embodied by the same hardware item. The use of the words first, second, third, and the like does not indicate any sequence. These words may be interpreted as names.

The above descriptions are only specific embodiments of the present disclosure or illustrations of the specific embodiments, and the protection scope of the present disclosure is not limited thereto. All variations or substitutions readily conceived by those skilled familiar with this art within the technical scope disclosed by the present disclosure shall fall within the protection scope of the present disclosure. The protection scope of the present disclosure shall be subject to the protection scope of the claims.

The invention claimed is:

1. A method for loading a visual localization map comprising a master map file and a plurality of sub-map files, the method comprising:
providing the master map file comprising key frame index information;
providing the plurality of sub-map files comprising map data of corresponding groups indexed by key frames from the key frame index information, each group comprising a group number;
localizing a current pose of an autonomous vehicle or a robot;

predicting, based on the current pose, a set of group numbers to be loaded for the visual localization map, wherein each group number in the set of group numbers to be loaded corresponds to one of the plurality of sub-map files of the visual localization map; and loading one or more of the sub-map files based on the group numbers in the set of group numbers to be loaded.

2. The method for loading the visual localization map of claim 1, wherein predicting, based on the current pose, the set of group numbers to be loaded for the visual localization map comprises:

planning a current desired trajectory for the autonomous vehicle or the robot based on the current pose; and predicting, based on the current desired trajectory and the master map file, the set of group numbers to be loaded.

3. The method for loading the visual localization map of claim 2, wherein predicting, based on the current pose, the set of group numbers to be loaded for the visual localization map comprises:

planning a current desired trajectory for the autonomous vehicle or the robot based on the current pose; and predicting, based on the current desired trajectory and the master map file, the set of group numbers to be loaded..

4. The method for loading the visual localization map of claim 3, wherein determining, based on world coordinates of the desired trajectory point and the master map file, the group numbers in the set of group numbers to be loaded comprises:

indexing the key frame index information based on the world coordinates of the desired trajectory point to obtain key frames within a first range; and traversing the key frames within the first range, comprising: for each of the key frames, determining, based on the key frame, the group numbers in the set of group numbers to be loaded until the number of group numbers in the set of group numbers to be loaded reaches the set threshold.

5. The method for loading the visual localization map of claim 4, further comprising: determining a circular area with a center of circle defined by the world coordinates of the desired trajectory point and a radius of a preset value as the first range.

6. The method for loading the visual localization map of claim 5, further comprising: determining the preset value based on a desired speed of the desired trajectory point.

7. The method for loading the visual localization map of claim 4, further comprising: determining a range including a preset number of key frames closest to the desired trajectory point as the first range.

8. The method for loading the visual localization map of claim 7, further comprising: determining the preset number based on the desired speed of a desired trajectory point.

9. The method for loading the visual localization map of claim 4, wherein determining, based on the key frame, the group numbers in the set of group numbers to be loaded comprises:

determining whether the sub-map file corresponding to the group number of the key frame has been loaded and whether the group number of the key frame has been included in the set of group numbers to be loaded; and in response to determining that the sub-map file corresponding to the group number of the key frame has not been loaded and the group number of the key frame has not been included in the set of group numbers to be loaded, adding the group number of the key frame to the set of group numbers to be loaded.

10. The method for loading the visual localization map of claim 3, wherein determining, based on the world coordinates of the desired trajectory point and the master map file, the group numbers in the set of group numbers to be loaded comprises:

indexing the key frame index information based on the world coordinates of the desired trajectory point to obtain key frames within a first range;

determining key frames within a second range from the key frames within the first range based on a heading of the desired trajectory point; and traversing the key frames within the second range, comprising: for each key frame, determining, based on the key frame, the group numbers in the set of group numbers to be loaded, until the number of group numbers in the set of group numbers to be loaded reaches the set threshold.

11. The method for loading the visual localization map of claim 1, wherein loading the one or more of the sub-map files based on the group numbers in the set of group numbers to be loaded comprises: loading the map data in the corresponding sub-map files into memory.

12. The method for loading the visual localization map of claim 1, wherein the master map file further stores a checksum of each of the sub-map files; and wherein the loading corresponding sub-map files based on the group numbers in the set of group numbers to be loaded further comprises:

obtaining the checksums of the sub-map files corresponding to the group numbers from the master map file; and checking the sub-map files corresponding to the group numbers based on the checksums.

13. The method for loading the visual localization map of claim 1, wherein localizing the current pose of the autonomous vehicle or the robot comprises: localizing the current pose using a sensor, wherein the current pose comprises a current position and heading of the autonomous vehicle or the robot.

14. The method for loading the visual localization map of claim 1, wherein localizing the current pose of the autonomous vehicle or the robot comprises:

obtaining a current image;

extracting feature points of the current image; and performing feature matching on the visual localization map based on the feature points to obtain the current pose.

15. The method of claim 1, further comprising:

loading the sub-map files to construct a local map based on the current pose;

obtaining an image to be localized; and performing visual localization using the local map based on the image to be localized.

16. A system for loading a visual localization map comprising a master map file and a plurality of sub-map files, the system comprising:

a processor configured to provide the master map file comprising key frame index information, and provide the plurality of sub-map files comprising map data of corresponding groups indexed by key frames from the key frame index information, each group comprising a group number;

a localization module configured to localize a current pose of an autonomous vehicle or a robot;

a prediction module configured to predict, based on the current pose, a set of group numbers to be loaded for the visual localization map, wherein each group number in the set of group numbers to be loaded corresponds to one of the plurality of sub-map files of the visual localization map; and a loading module configured to load one or more of the sub-map files based on the group numbers in the set of group numbers to be loaded.

17. The system of claim 16, wherein, to predict, based on the current pose, the set of group numbers to be loaded for the visual localization map, the prediction module is further configured to:

plan a current desired trajectory for the autonomous vehicle or the robot based on the current pose; and predict, based on the current desired trajectory and the master map file, the set of group numbers to be loaded.

18. The system of claim 17, wherein, to predict, based on the current desired trajectory and the master map file, the set of group numbers to be loaded, the prediction module is further configured to:

traverse desired trajectory points in the desired trajectory based on their distances from a current position; and for each of the desired trajectory points, determine, based on world coordinates of the desired trajectory point and the master map file, the group numbers in the set of group numbers to be loaded until the number of group numbers in the set of group numbers to be loaded reaches a set threshold.

19. The system of claim 16, wherein, to localize the current pose of the autonomous vehicle or the robot, the localization module is further configured to localize the current pose using a sensor, wherein the current pose comprises a current position and heading of the autonomous vehicle or the robot.

20. A non-transitory computer-readable storage medium including instructions that, when accessed by a processor, cause the processor to load a visual localization map comprising a master map file and a plurality of sub-map files by:

providing the master map file comprising key frame index information;

providing the plurality of sub-map files comprising map data of corresponding groups indexed by key frames from the key frame index information, each group comprising a group number;

localizing a current pose of an autonomous vehicle or a robot;

predicting, based on the current pose, a set of group numbers to be loaded for the visual localization map, wherein each group number in the set of group numbers to be loaded corresponds to one of the plurality of sub-map files of the visual localization map; and loading one or more of the sub-map files based on the group numbers in the set of group numbers to be loaded.

* * * * *